March 31, 1970 TAMAKI OHASHI 3,503,270

PUSHBUTTON TYPE TUNING APPARATUS

Filed April 22, 1968 3 Sheets-Sheet 1

INVENTOR

BY Tamaki Ohashi

ATTORNEY

INVENTOR

BY *Tamaki Ohashi*

ATTORNEY

INVENTOR

Tamaki Ohashi

United States Patent Office 3,503,270
Patented Mar. 31, 1970

3,503,270

PUSHBUTTON TYPE TUNING APPARATUS

Tamaki Ohashi, 1629 Tanashi-shi, Tokyo, Japan

Filed Apr. 22, 1968, Ser. No. 723,117
Int. Cl. F16h *35/18*
U.S. Cl. 74—10.33 16 Claims

ABSTRACT OF THE DISCLOSURE

A pushbutton tuner having a plurality of pushbuttons, the depression of each of which simultaneously acts to adjust a receiver to a pre-set broadcast band and a pre-set frequency. Each pushbutton is coupled to a pair of arms, one of which carries a lockable tuning frequency adjustment plate and the other a broadcast band selector plate. The tuning frequency adjustment plate is locked in a position corresponding to a pre-selected frequency when the pushbutton is depressed after the latter plate has been released, whereas the broadcast band selector plate is directly adjusted from the front of the pushbutton.

BRIEF SUMMARY OF THE INVENTION

This invention relates to a pushbutton tuner of the type in which selective switching of the broadcast band can be also effected simultaneously with selection of the tuning frequency.

A pushbutton tuner of this type has been employed hitherto in various forms, for example, in a car radio or the like, but these are so designed that each pushbutton is exclusively effective for a single broadcast band and cannot be used for any other broadcast bands.

This invention has for an object to provide a pushbutton tuner of the type referred to above, wherein each pushbutton is operable for a plurality of broadcast bands and can switch to a selected band and frequency when depressed.

In accordance with the invention each pushbutton is coupled to an arm means to move the same as the pushbutton is depressed. The arm means carries a first means for acting on a frequency adjustment control to regulate the same, said first means having locked and unlocked positions.

A locking means is carried by said arm means to lock the first means in a pre-set position as determined by a preselected initial position of the frequency adjustment control such that the locked first means will act on the control when the pushbutton is subsequently depressed to adjust the control to said pre-selected position. The arm means also carries second means which is settable to a pre-selected position such that when the pushbutton is depressed the second means will act on a broadcast band selector control to adjust the same to a band corresponding to the pre-selected position.

DETAILED DESCRIPTION

Figure 1:
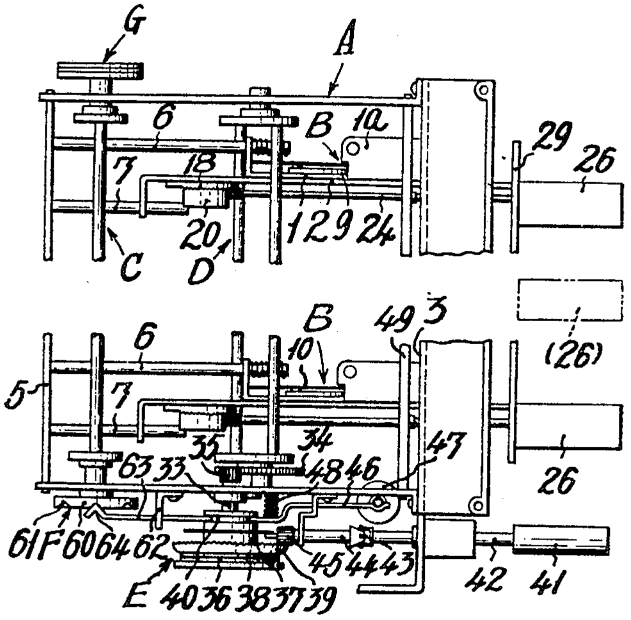
FIGURE 1 is a top plan view of one embodiment of the apparatus of the present invention, with parts thereof omitted.

Referring to FIG. 1, a frame is denoted by A and a plurality of pushbutton devices B are mounted thereon so as to be slidable to the front and back. A broadcast band switching crank C and a tuning frequency setting crank D are rotatably mounted on frame A in spaced relation and extend at right angles to pushbutton devices B. A mechanism E for turning the crank D and a mechanism F for fixing the crank C are mounted at one side surface of the frame A and a broadcast band selector switch G, coupled to the crank C, is mounted at the other side surface of the frame A.

Figure 2:
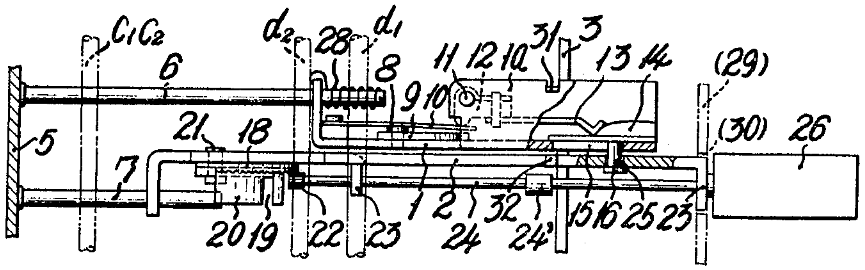
FIGURE 2 is a top plan view, partly in section, and on enlarged scale, of part of the appartus of FIG. 1.
Figure 3:
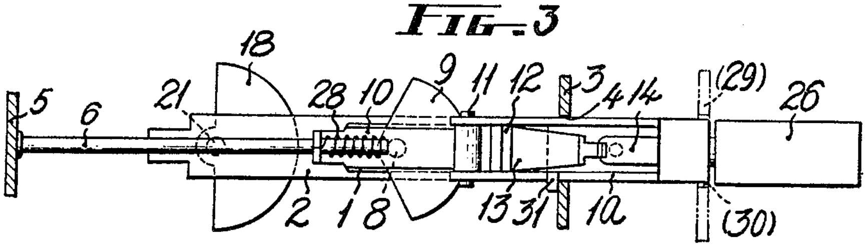
FIGURE 3 is a side view thereof as viewed in one direction.
Figures 4, 5, 6, 7, 8:
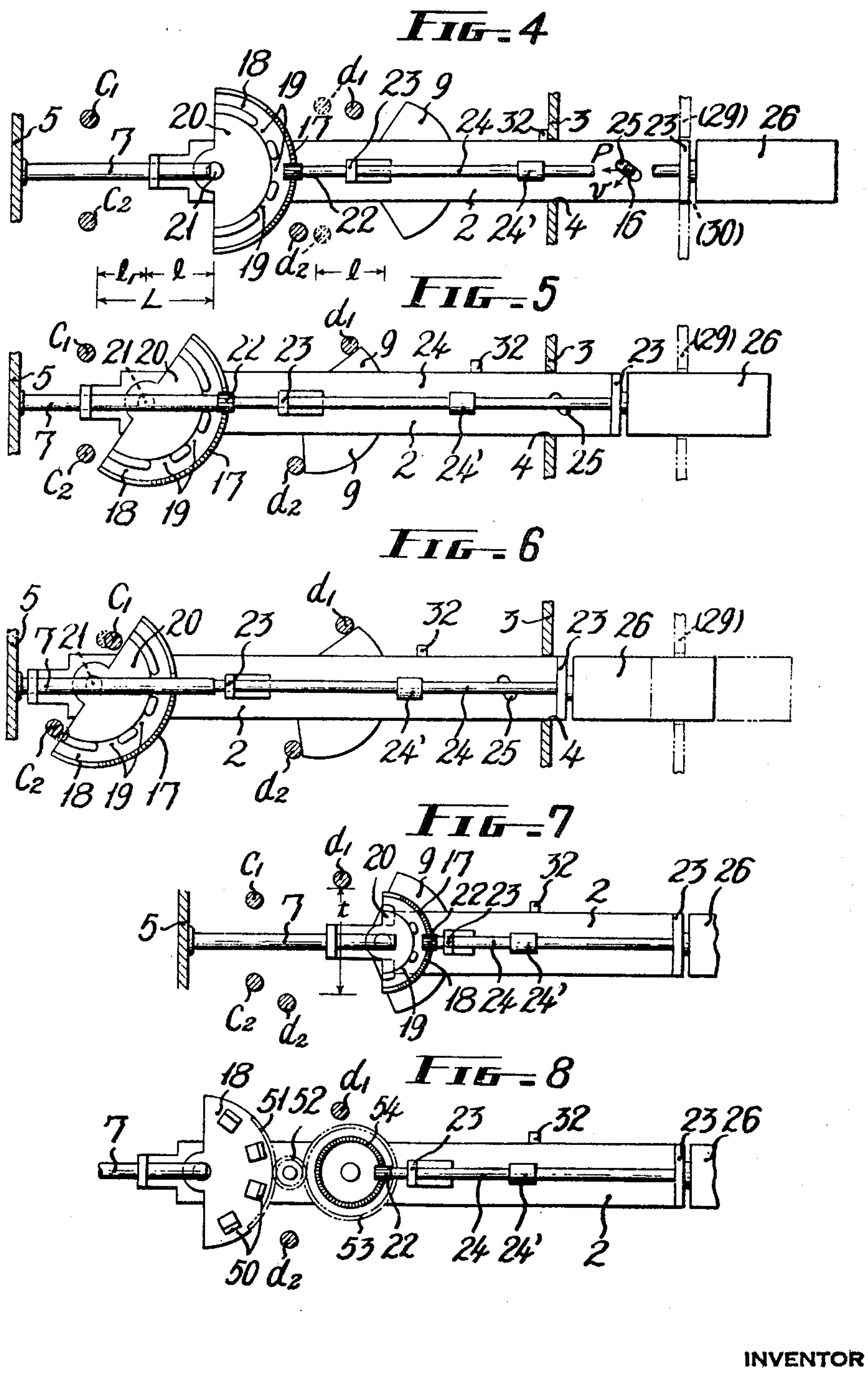
FIGURE 4 is a side view thereof as viewed in the opposite direction.
FIGURE 5 is a side view, similar to FIG. 4, wherein a tuning frequency setting plate is in engagement with a crank for varying a tuning element.
FIGURE 6 is a side view, similar to FIG. 4, wherein a broadcast band setting plate is in engagement with a broadcast band switching crank.
FIGURE 7 is a side view similar to FIG. 4 of a modified form of the apparatus, with parts thereof omitted.
FIGURES 8 and 9 are side and top plan views respectively, of another modified form of the apparatus, with parts thereof omitted.

Next, the construction of each portion will be explained as follows:

Referring to FIGS. 2–4 illustrating one pushbutton apparatus B, numerals 1 and 2 designate metallic arms, each of which is inserted at its rear end portion in a common groove 4 formed in a front surface plate 3 of the frame A. The arms are supported at their front end portions by respective rods 6 and 7 projecting from a rear surface plate 5 of the frame A so that the arms 1 and 2 are slidably independently of one another in longitudinal direction. The arm 1 is provided with a tuning frequency setting plate 9 of segmental or semi-circular form supported rotatably by a pin 8. A resilient plate 10 is fixed at one end thereof and extends at its other end in spaced relation above the surface of the plate 9. A locking member 12 is rotatably supported on an axle 11 mounted in a channel-shaped portion 1*a* formed at the rear end portion of the arm 1. A resilient plate 13, extending rearwards from the locking plate 12, has a rear portion of V shape which is in abutment with a wedge-shaped member 14 having a raised portion formed on the side surface of a plate mounted slidably in the channel-shaped portion 1*a*. A pin 16 projecting from the lower surface of the wedge-shaped member 14 is inserted in a longitudinal slot 15 formed in the arm 1.

Figure 12:
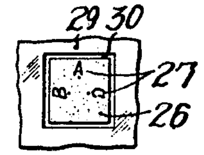
FIGURES 12 and 13 are front views of the pushbutton shown in FIGS. 4 and 5 respectively.

The other arm 2 is provided with a gear plate 18 in the form of a semi-circular or segmental plate with a peripheral rim provided at its middle portion with teeth 17, and a broadcast band setting plate 20 of a semi-circular or segmental shape, smaller in diameter than the plate 18, and having a peripheral rim with notches 19, suitably located therein, in a number corresponding to the number of broadcast bands to be switched. The plates 18 and 20 are coupled together as a unit as if integral and are rotatably supported on shaft 21 on the arm 2. The arm 2 is also provided with a pinion 22 meshing with the gear plate 18, and a rotating shaft 24 rotatably supported by supporting members 23 which are formed respectively by a bent rear portion of the arm 2 and a tongue formed from arm 2 at the middle thereof. The rotating shaft 24 is fixed in its longitudinal direction, in relation to the arm 2, and has at its middle portion a joint 24'. The pin 16, in the slot 15, is further inserted in an inclined opening 25 formed in the arm 2. Numeral 26 denotes a pushbutton fixed to the rear end of the shaft 24. Characters 27 are placed on the face of pushbutton 26 at 90 degree intervals to indicate the selected broadcast bands (FIG. 12). Numeral 28 is a return spring for the arm 1. Numeral 29 is a panel provided in front of the front surface plate 3 of the frame A, and in the illustrated example, the panel 29 has a square opening 30 corresponding to the shape of the pushbutton 26. Numerals 31 and 32 are stops provided on the arms 1 and 2, respectively.

The mechanism E for rotatable adjustment of the crank D will next be explained with refernce to FIG. 1.

The mechanism E is similar in construction to the conventional ones. Namely, a rotatable shaft 33 is mounted in the side plate of the frame A, and a pinion 35 meshing with a segmental gear 34 provided on the crank D is attached to the inner end of the shaft 33 and one side clutch plate 36 is attached to the outer end of the shaft 33. The shaft 33 has an external shaft 37 slidably mounted thereon for axial movement, and this external shaft 37 supports the other side clutch plate 38 and a crown gear 39. The shaft 37 has a periphery with an annuar groove 40 formed therein. The crown gear 39 is in mesh with a pinion 45 which is connected to a shaft 44, rotatably coupled, via a universal joint 43, to a shaft having a knob 41. A lever plate 46 is supported at its center on a side surface of the frame A and is engaged at one end in the groove 40 while its other end carries a roller 47 positioned near the side surface of the frame A. Numeral 48 denotes a spring which acts on the lever 46 to urge the two clutch plates 36 and 38 into contact under pressure. When any desired pushbutton 26 is pushed, a horizontal rod 49 with comb teeth is tilted by a push member (not shown) on the pushbutton apparatus, whereby the roller 47 is pushed outward and, through the action of the lever plate 46, the clutch plates 36 and 38 are separated from one another to release the coupling of the knob 41 to the crank D, whereby the rotation of the crank D is now possible without resistance by said coupling.

Figure 13:
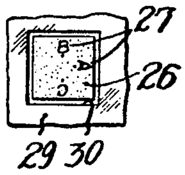
Figure 14:
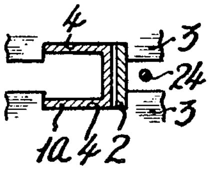
FIGURE 14 is a diagrammatic illustration, partly in section, showing the relation between each arm and a machine frame front surface plate.

The operation of the pushbutton B, which is the characterizing portion of this invention and that of other mechanisms relating thereto, will be explained as follows:

FIG. 4 shows the condition where the plate 9 is released from the locking plate 10 so as to be in a freely rotatable condition (the plate 9 is illustrated in its middle position for a better understanding of the construction and operation thereof, though in fact the plate 9 hangs downwards by its own weight). The plate 20 is in a position such that it selects the "A" broadcast band. From the condition in FIG. 4, a certain frequency in the "B" broadcast band can be selected by tuning the knob 41 so that parallel rods $d_1$ and $d_2$ of the crank D are moved from the position in dotted lines to the position in solid lines. Accordingly, the tuning element (not shown) moving with the crank D is varied to set a tuning point. Then, the pushbutton 26 is rotated from the condition of FIG. 12 to the condition of FIG. 13, whereby through the meshing engagement between the gear plate 18 and the pinion 22, the plate 20 is turned to the position shown in FIG. 5. If, in this position, the pushbutton 26 is pushed, through the contact engagement between the rear end of the resilient plate 13 and the front surface of the raised portion of the wedge-shaped member 14 and the engagement between the pin 16 and the inclined opening 25, the two arms 1 and 2 are advanced against the action of the return spring 28, whereby the plate 9 strikes against parallel rods $d_1$ and $d_2$ of the crank D and assumes a position of coincidence with the angle of the crank D and in this position the arm 1 is stopped in its further advance (FIG. 5). If the pushing force applied to the pushbutton 26 is further increased, the wedge-shaped member 14 begins to wedge between the resilient plate 13 and the arm 1 and, at the same time, the pin 16 moves in the slot 15 to allow further advance of the arm 2. This is continued until the pin 16 reaches the front end portion of the slot 15. During this operation, the resilient plate 13 is deflected substantially and the locking member 12 acts on resilient plate 10 which presses the front end of the plate 9 firmly against the surface of the arm 1 to lock the plate in angular position. Meanwhile, the advance of the arm 2 is continued during the period from the time when the plate 9 begins to be locked by the locking member 12 to the time when such locking is completed, and at the end of this period the arm 2 causes parallel rods $C_1$ and $C_2$ of the crank C to be fully in coincidence with the angle of the plate 20. Accordingly, the broadcast band change-over switch G, moving with the crank C, is switched to the "B" broadcast band (FIG. 6). Any resistance force exerted on the plate 20, as the plate contacts the parallel rods $C_1$ and $C_2$, will be opposed, as shown in FIG. 5, because a part of the rod 7 is already in engagement with the corresponding notch 19 for fixing the angular position of plate 20. When the plate 9 is being locked by the locking member 12, the force P applied to the pushbutton 26 produces a component force V, because of the relation between the pin 16 and the inclined opening 25, and this component force V serves to forcibly press the arm 2 downwards and the arm 1 upwards. Accordingly, any gap existing between the arm 1 and the groove 4 becomes substantially negligible so that an accurate location of the tuning point can be accomplished. If the pushing force applied to the pushbutton is released from the condition of FIG. 6, the entire pushbutton apparatus returns, as it is, automatically to the position shown by chain-dotted lines in FIG. 6 by the action of the return spring 28.

In this return position, the plate 9 is locked in the angular position corresponding to the selected position of the crank C. The wedge-shaped member is wedged between plate 13 and arm 1 and pin 16 is at the front end of slot 15, i.e., closer to plate 9. The abutment 31 is in contact with plate 3. The pushbutton 6 is partially inserted in plate 29 in this return position in which the broadcast band and frequency have been pre-set. The chain-dotted lines in FIG. 6 show this partially inserted position. If the pushbutton is subsequently pushed in after the broadcast band and frequency have been changed, the plates 9 and 18 will act on the cranks D and C respectively to return them to the pre-selected position of the plates.

In order to change the pre-set position of the frequency, the pushbutton is pulled back until abutment 32 contacts plate 3. The pushbutton is then fully retracted from the plate 29. This retraction of the pushbutton causes the wedge-shaped member 14 to move rearwardly with pin 16 in slot 15 to free the resilient member and hence unlock plate 9. The resetting procedure is the same as that described previously.

The operation as mentioned above is applicable to all of the pushbutton apparatuses provided on the frame A. Thereafter, solely by pushing the pre-set pushbuttons 26, the switching of the broadcast band and the selection of the tuning frequency is simultaneously effected. The above example has been shown for the case when the broadcast bands are three in number, but the number of broadcast bands can be increased by increasing the number of the notches 19.

In the apparatus as described above, each pushbutton apparatus is provided not only with the tuning frequency setting plate, but also with the mechanism for independently switching the broadcast bands so that it becomes possible that all the pushbuttons can be used for middle-wave broadcasting or for short-wave broadcasting or the like, thus having widely varied utility. Additionally, the pushbutton apparatus is extremely convenient for manufacturing and assembling and is adaptable for mass production.

Additionally, according to this invention, the mutual connection between the two arms and the wedge-shaped member is of great importance, the arm having the frequency plate 9 being forcibly pushed in its width direction when the plate is being locked completely, so that any error in the engaging angle between the plate and the parallel rods of the crank caused by a gap between the arm and the frame is eliminated, making it possible to maintain selection of the tuning point with high accuracy. Additionally, the pushbutton apparatus itself incorporates the broadcast band switching plate and the mechanism for rotating the same, so that by utilizing this rotating mechanism, the switch band indicia can be put on the pushbutton itself, whereby the receiving condition dictated by the pushbutton can be easily seen.

Further modifications of the construction are given hereafter.

In FIG. 7, the diameter of the gear plate 18 is made smaller than the inner distance between the parallel rods $d_1$ and $d_2$ of the crank D at its extreme rotating angle position. In such construction, the gear plate 18 can pass freely between the parallel rods $d_1$ and $d_2$ regardless of the inclination of the rods, so that the entire length of the pushbutton apparatus can be substantially reduced to render the apparatus compact, as will be clearly understood from a comparison of FIG. 7 with FIG. 4. The plate 20, in this case, will be decreased in size in accordance with the decrease of the size of the gear plate 18, but the width of the notch 19 cannot be decreased because this is made in correspondence with the diameter of the rod 7. Accordingly, this modification is especially effective when the number of the switching broadcast bands is small. This modification, however, can also be effective when the number of switching bands is large, and in such case instead of the rod 7, there may be provided a small projection projecting, for example, from a ceiling plate of the frame A to cause the projection to engage with any of the notches when the plate 20 is in coincidence with the crank C, whereby it becomes possible to decrease the width of each notch.

Figure 9:
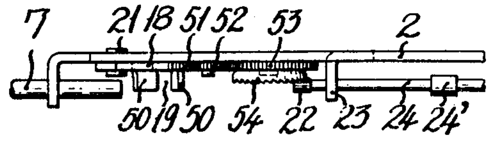

As shown in FIGS. 8 and 9, the gear plate 18 itself can be provided with cut-out pieces 50 to form notches 19 therebetween and a gear 52, meshing with teeth 51 in the middle portion of the periphery of the gear plate 18 and another gear 53 of different diameter from the gear 52 are rotatably arranged on the arm 2, and additionally, a crown gear 54 fixed on the gear 53 is in mesh with the pinion 22. As so constructed, it will be clear from a comparison with FIG. 2, that the rod 7 and the rotating shaft 24 are not required to be offset from one another in a lateral direction so that the lateral width of the pushbutton can be decreased and, at the same time, the rotating ratio between the rotating shaft 24 and the plate 18 can be varied widely to provide various advantages in design and use.

Figure 10:
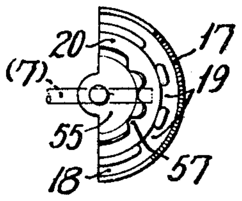
FIGURES 10 and 11 are plan and sectional views, respectively, of a modified form of the broadcast band setting plate portion.
Figure 11:
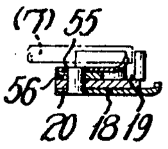

Additionally, as shown in FIGS. 10 and 11, the plate 20 may be provided thereon with a resilient plate 55 of smaller diameter. A small part 56 is disposed between plate 55 and plate 20 so that the periphery of plate 55 can be deflected. The periphery is curved upwards and has recesses 57 facing the notches 19. The top end of the rod 7 is always kept in engagement with one of these recesses 57. As so constructed, a snap switching of the broadcast bands can be achieved positively and, at the same time, unnecessary rotation of the plate 20, as for example, by vibration or the like, is prevented and the rod 7 can be inserted exactly in the notches 19.

Figure 15:
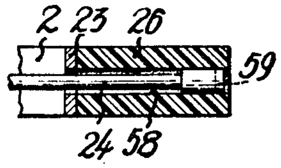
FIGURE 15 is a sectional view showing the relation between a pushbutton and a rotating shaft in another example.
Figure 16:
FIGURE 16 is a front view of the arrangement in FIG. 15.

Additionally, as shown in FIGS. 15 and 16, the pushbutton 26 can be fixed to the rear end of the arm 2 and the rotating shaft 24 can be rotatably mounted in an opening 58 formed in the pushbutton 26. A groove 59 is formed on the end surface of the shaft 24, so that by inserting the top of a screwdriver or the like into the groove 59, the shaft 24 may be rotated independently of the pushbutton 26. Consequently, there is avoided the disadvantage that when the rotating shaft 24 is rotated by the pushbutton 26, the plate 20, after being set, might be varied by unnecessary rotation of the pushbutton 26.

A desirable condition of the pushbutton apparatus is shown in FIG. 4, wherein the total sum of the distance $l$ from a point where the pushbutton 26 is pushed to a point where the plate 9 is fully in coincidence with the crank D and the distance $l_1$ from the latter point to a point where the wedge-shaped member 14 is wedged between the resilient plate 13 and the arm 1 to fully lock the plate 9 is equal to the distance L from a point where the pushbutton 26 is pushed to a point where the plate 20 is fully in coincidence with the crank C. However, it is very difficult in manufacture to obtain the above relation accurately. If the apparatus is so manufactured that L is smaller than $l+l_1$, the arm 2 is prevented from undergoing sufficient advance, so that the locking condition of the plate 9 becomes uncertain and this introduces an error of frequency selection.

In order to avoid this possibility, the invention is characterized in that L is somewhat larger than $l+l_1$. If so constructed, in the condition of FIG. 6, the parallel rods $C_1$ and $C_2$ do not fully coincide with the plate 20 but have a slight play, as shown in solid lines. This is satisfactory, however, because though an extremely accurate setting is required for the plate 9, such an accurate setting is not required for the plate 20.

Figure 17:
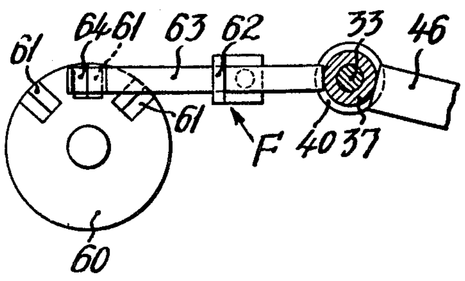
FIGURE 17 is a side view showing a fixing mechanism for the broadcast band switching crank.

In the case when, in the above construction, the required accurate setting of the plate 20 is not obtained, or the electrical contact of the broadcast band change-over switch G is not positive, there may be provided the fixing mechanism F for the crank C, as shown in FIGS. 1 and 17. In these figures is seen a disc 60 attached to the shaft of the crank C and there are provided on the periphery of the disc 60, V-shaped concave portions 61 in coincidence with the rotating angle positions of the crank C. A resilient plate 63, which is supported at its center by a supporting plate 62, serves as a lever and has at one end a V-shaped engaging claw 64 which is adapted for being in engagement with one of the concave portions 61. The other end of the resilient plate 63 is inserted in the groove 40 of the mechanism E. Thereby, the movement of the external shaft 37 (at the time when the pushbutton 26 is pushed and the clutch plates 36 and 38 are released from their mutual contact) is utilized to operate the resilient plate 63 and thereby separate the engaging claw 64 from the concave portions 61, whereby any unnecessary resistance is not applied to the rotation of the crank C. When the pushing force on the pushbutton 26 is released, the mechanism E is returned to its initial condition, whereby the engaging claw 64 comes to a position of coincidence with a concave portion 61. If, at this time, the engaging claw 63 does not come into exact coincidence with a concave portion 61, they are forced into coincidence automatically by the resilient force of the resilient plate 63, whereby not only will the rotating angle of the crank C be accurately obtained, but also the electrical contact of the change-over switch G will be assured and additionally any movement of the switch by vibration or the like will be prevented.

Thus, the present invention discloses an extremely useful embodiment of a pushbutton tuner simultaneously effecting broadcast band selection and frequency selection.

There will now be obvious to those skilled in the art numerous modifications and variations of the disclosed embodiments, which will not depart from the invention.

What is claimed is:

1. A pushbutton tuner comprising a depressible pushbutton, frequency adjustment means, broadcast band selector means, arm means coupled to said pushbutton for undergoing movement therewith as the pushbutton is depressed, first means on said arm means for acting on said frequency adjustment means to regulate the same, said first means having locked and unlocked positions, locking means coupled to said arm means for locking said first means in a pre-set locked position as determined by a pre-selected initial position of the frequency adjustment means such that the locked first means will act on the frequency adjustment means when the pushbutton is depressed to adjust the frequency adjustment means to said pre-selected position, and second means on said arm means settable to a pre-selected position such that when the pushbutton is depressed the second means will act on the broadcast band selector means to adjust the same to a band corresponding to said pre-selected position, said pushbutton being supported for rotation, said tuner further comprising means coupling said pushbutton and said second means to cause the latter to be set to pre-selected positions in correspondence with rotation of said pushbutton.

2. A tuner as claimed in claim 1, wherein said arm means comprises first and second longitudinally slidable arms, said first means comprising a tuning frequency adjustment plate pivotably mounted on the first arm, said second means comprising a broadcast band selector plate pivotably mounted on the second arm, said frequency adjustment means and said broadcast band selector means respectively comprising cranks including parallel rods engageable with corresponding plates.

3. A tuner as claimed in claim 2 comprising means for acting on said first arm to cause transverse displacement thereof as said first means is being locked.

4. A tuner as claimed in claim 2, wherein one of said plates has a transverse extent which is less than the minimum distance between the rods associated with the other plate to enable said one plate to pass between the latter rods as the arms are longitudinally displaced.

5. A tuner as claimed in claim 2, wherein said broadcast band selector plate is provided with a notch for each band which can be selected, said tuner comprising means for engaging in the notch corresponding to the selected band prior to contact of the broadcast band selector plate with the associated cranks whereby the latter plate is locked on said second arm in a position corresponding to said selected band.

6. A tuner as claimed in claim 5 comprising a resilient member on said broadcast band setting plate, said resilient member having notches one of which is always engaged with said means which is to engage the notches in said selector plate whereby to hold the plate against vibration and permit snap engagement of the latter means in the notches of the selector plate.

7. A tuner as claimed in claim 2 comprising gear means coupling said broadcast band selector plate and the remainder of said second means.

8. A tuner as claimed in claim 2, wherein said first and second arms have slots, said locking means comprising a resilient member on said first arm forcibly engageable with said tuning frequency adjustment plate to hold the same in position on said first arm, a slidable wedge-shaped member on said first arm operatively engageable with said resilient member to urge the same into forcible engagement with said tuning frequency adjustment plate, and a pin connected to said wedge-shaped member and engaged in said slots.

9. A tuner as claimed in claim 8, wherein said slot in the first arm is longitudinally elongated and the slot in the second arm is inclined at an angle with respect to the direction of longitudinal sliding movement of said arms.

10. A tuner as claimed in claim 2, wherein said broadcast band selector plate is pivotally movable between preselected angular positions corresponding to the various bands which can be selected, said selector plate having notches, one for each band to be selected, and a fixed rod slightly supporting the second arm and engageable in the notch of the selector plate corresponding to the selected angular position thereof as the second arm is displaced by the depression of the pushbutton.

11. A tuner as claimed in claim 2 comprising means slidably connecting said arms for relative movement between first and second positions, the first position corresponding to unlocked position of the tuning frequency adjustment plate, and the second position corresponding to locked position of the tuning frequency adjustment plate, said tuning frequency adjustment plate contacting said rods of its associated crank before the broadcast band selector plate contacts the rods of its associated crank, said tuning frequency adjustment plate then being locked as said second arm slides relative to the first arm to carry said broadcast band selector plate into contact with said rods of its associated crank.

12. A tuner as claimed in claim 11, wherein said means which slidably connects said arms is coupled to said locking means such that with said tuning frequency adjustment plate locked said arms are also locked together for common movement; and spring means acting on one of said arms to return said arms and the pushbutton to a withdrawn position following depression of the pushbutton.

13. A tuner as claimed in claim 11, wherein said stroke of the second arm is slightly less than that required to turn the crank for said broadcast band selector means to the selected position whereby said crank is brought to a position proximate with selected position, said tuner further comprising means for acting on the crank for said broadcast band selector means to move the same to said selected position after the broadcast band selector plate has brought it to said proximate position.

14. A tuner as claimed in claim 1, wherein said means coupling said pushbutton and said second means comprises a rotatable shaft operatively engaged with said second means.

15. A tuner as claimed in claim 1 comprising means acting on said broadcast band selector means to hold the same in fixed position corresponding to a selected band, the latter means comprising a plate which is movable in correspondence with the adjustment of the broadcast band selector means, said plate having concave recesses therein corresponding to the bands to be selected, and a claw engageable in said recesses as the plate is moved to insure precise adjustment of the plate for the particular selected band, and means for releasing said claw as the pushbutton is depressed.

16. A tuner as claimed in claim 1 comprising a frame including a front surface plate having an opening thereon, said first arm including a channel shaped portion slidably mounted in said opening.

References Cited

UNITED STATES PATENTS

| | | | |
|---|---|---|---|
| 2,315,331 | 3/1943 | Horowitz et al. | 334—7 |
| 2,452,067 | 10/1948 | Owens | 74—10.33 |

MILTON KAUFMAN, Primary Examiner

U.S. Cl. X.R.

334—7